US012500936B2

(12) United States Patent
Cao

(10) Patent No.: US 12,500,936 B2
(45) Date of Patent: Dec. 16, 2025

(54) SCENARIO-BASED ACCESS ENTITLEMENT ENGINE AND CONTROLLER

(71) Applicant: BANK OF AMERICA CORPORATION, Charlotte, NC (US)

(72) Inventor: Min Cao, Singapore (SG)

(73) Assignee: BANK OF AMERICA CORPORATION, Charlotte, NC (US)

( * ) Notice: Subject to any disclaimer, the term of this patent is extended or adjusted under 35 U.S.C. 154(b) by 199 days.

(21) Appl. No.: 18/110,035

(22) Filed: Feb. 15, 2023

(65) Prior Publication Data

US 2024/0275820 A1  Aug. 15, 2024

(51) Int. Cl.
*H04L 9/40* (2022.01)
*G06F 21/31* (2013.01)

(52) U.S. Cl.
CPC ............ *H04L 63/20* (2013.01); *G06F 21/316* (2013.01); *H04L 63/107* (2013.01)

(58) Field of Classification Search
CPC ..... H04L 63/20; H04L 63/107; H04L 63/102; H04L 63/108; G06F 21/316
See application file for complete search history.

(56) References Cited

U.S. PATENT DOCUMENTS

| | | | |
|---|---|---|---|
| 9,356,939 B1 | 5/2016 | Gates | |
| 9,607,142 B2 | 3/2017 | Dharmarajan | |
| 9,736,120 B2 | 8/2017 | Glazemakers | |
| 9,763,093 B2 | 9/2017 | Richards | |
| 9,888,015 B2 | 2/2018 | Morelli, Jr. | |
| 10,063,521 B2 | 8/2018 | Glazemakers | |
| 10,089,480 B1 | 10/2018 | Wang | |
| 10,320,798 B2 | 6/2019 | Faitelson | |
| 10,963,575 B2 | 3/2021 | Wang | |
| 11,463,482 B2 | 10/2022 | Fainberg | |
| 11,983,283 B2 | 5/2024 | Ghiold | |
| 2005/0060572 A1 | 3/2005 | Kung | |
| 2007/0157297 A1 | 7/2007 | Patrick | |
| 2013/0091539 A1* | 4/2013 | Khurana | G06F 21/577 726/1 |
| 2014/0075492 A1 | 3/2014 | Kapadia | |
| 2015/0012966 A1 | 1/2015 | Tandon | |
| 2015/0106888 A1 | 4/2015 | Cheng | |
| 2016/0088005 A1 | 3/2016 | Sinnema | |
| 2017/0295181 A1 | 10/2017 | Parimi | |
| 2018/0069866 A1 | 3/2018 | Chalmers | |
| 2019/0073473 A1* | 3/2019 | VanderLeest | G06F 21/554 |

(Continued)

*Primary Examiner* — Taghi T Arani
*Assistant Examiner* — Blake I Narramore
(74) *Attorney, Agent, or Firm* — Moore & Van Allen PLLC; Anup Lyer

(57) ABSTRACT

Access entitlement decisioning for a network-based application occurs dynamically at the time of access request based on current scenario indicators. In addition to determining whether a user should be granted access/entitlement, in certain instances, the current scenario indicators are relied upon to determine the level of entitlement/access (i.e., less or more than standard access) and the period for enforcing the determined access/entitlement. The current scenario indicators may be associated with the user, the application and/or the computing environment and are indicative of a heightened awareness for the occurrence of potential deceptive events or the likelihood for inefficiencies in use of the application and/or computing environment.

15 Claims, 3 Drawing Sheets

(56) References Cited

U.S. PATENT DOCUMENTS

| | | | |
|---|---|---|---|
| 2020/0226259 A1* | 7/2020 | Bolignano | G06F 8/436 |
| 2021/0392135 A1 | 12/2021 | Rao | |
| 2022/0156396 A1* | 5/2022 | Bednash | G06F 21/554 |
| 2022/0358195 A1 | 11/2022 | Pham | |
| 2022/0385687 A1* | 12/2022 | McKinley | H04L 63/1441 |
| 2023/0068946 A1* | 3/2023 | McCarthy | G06F 21/554 |
| 2023/0085382 A1* | 3/2023 | Saini | H04L 63/20 |
| | | | 726/26 |
| 2023/0122924 A1* | 4/2023 | Lukiyan | G06F 9/4498 |
| | | | 726/22 |
| 2023/0156020 A1* | 5/2023 | McCarthy | H04L 63/20 |
| | | | 726/22 |
| 2023/0171291 A1* | 6/2023 | Raut | H04L 63/205 |
| | | | 726/1 |
| 2023/0188545 A1* | 6/2023 | Kaciulis | H04L 63/1441 |
| | | | 726/1 |
| 2023/0305825 A1* | 9/2023 | Volpe | G06F 8/60 |
| 2023/0412642 A1* | 12/2023 | Arora | H04L 63/20 |
| 2024/0114019 A1* | 4/2024 | Olden | H04L 63/0815 |

\* cited by examiner

SCENARIO-BASED ACCESS ENTITLEMENT ENGINE AND CONTROLLER

FIELD OF THE INVENTION

The present invention is related controlling user entitlement/access to computing-network based applications and, more specifically, systems and methods for dynamic scenario-based access entitlement to computing network-based applications, which takes into account the current state/status of the user, the application and/or computing hardware on which the application is executed.

BACKGROUND

In most instances user access to a computing network-based application is granted in response to the user providing their access credentials. In specific instances, the application administrator or the like may adjust the user's access privileges, such as denying access or limiting the user's access (i.e., less than full application functionality) based on perceived security threats and/or other concerns with the application and or computing network. Such adjustments may occur in advance of a user requesting access or may occur at the time of an access request as a result of a user providing incorrect access credentials (i.e., incorrect username/passcode or the like).

However, other than instances of providing incorrect access credentials, no means currently exist for determining access entitlement decisions based on the current status (i.e., at the time the access request is received) of the user, the application and/or the computing network. In this regard, in terms of the user, known access entitlement methodology does not consider such dynamic factors as the geographic location of the user/access request, the time of day of the access request, and/or user behaviors within the computing network just prior to requesting application access. Moreover, in terms of the application itself, known access entitlement methodology does not consider such dynamic factors as current application load and/or current rate of illicit/wrongful events occurring within or otherwise related to the application.

Therefore, a need exists to develop systems, methods, computer program products and the like which provide a means for making application-level entitlement/access decisions based on the dynamic scenario experienced by the user, the application and/or the computing environment/network at the time of the access request. In this regard, the desired systems, methods and computer program products should be capable of denying and, in other instances, limiting the access provided to a user when the current circumstances surrounding the user, the application and/or the computing network dictate such.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for a systematic approach to providing access/entailment to network-based applications, which relies on the dynamic/current scenario of the user, the application and/or the computing environment. As a result, dynamic access/entitlement decisioning can be accomplished, which provides options for granting the user access/entitlement, including granting full access, denying access, and limiting access including customized user-specific limited access. In addition, the dynamic/current scenario indicators may be relied on to determine the period for enforcing the determined application entitlement/access.

A system for dynamic scenario-based access entitlement (i.e., permissions) determination and control defines first embodiments of the invention. The system includes a computing platform having a memory and one or more computing device processors in communication with the memory. The system additionally includes an access entitlement engine that is stored in the memory and executable by at least one of the one more computing device processors. The access entitlement engine is configured to receive a request from a user to access a computing network-based application, and, in response to receiving the user request, determine one or more present scenario parameters associated with a present scenario of at least one of (i) the user, (ii) the computing network-based application, and (iii) one or more network devices currently executing the computer-network-based application. The access entitlement engine is further configured to, in response to determining the one or more present scenario parameters, determine (i) an access entitlement for the request based at least on the one or more present scenario parameters. The access entitlement is chosen from the group consisting of (i) allow standard access to the computing network-based application, (ii) deviate from standard access to the computing network-based application, and (iii) deny access to the computing network-based application. In addition, the system includes an access controller that is stored in the memory, executable by at least one of the one or more computing device processors, and in communication with the access entitlement engine. The access controller is configured to respond to the request by controlling access to the computing network-based application in accordance with the determined access entitlement.

In specific embodiments of the system, the access entitlement engine is configured to determine the one or more present scenario parameters associated with the present scenario of the user, wherein the one or more present scenario parameters associated with the present scenario of the user includes at least one of (i) a geographic a location of the user, (ii) a current time at which the user is requesting access, and/or (iii) an occurrence of one or more predetermined triggering events by the user in the computing network prior to requesting access.

In other related embodiments of the system, the access entitlement engine is configured to determine the one or more present scenario parameters associated with the present scenario of the user, wherein the one or more present scenario parameters associated with the present scenario of the user includes current user behavior exhibited in the computing network prior to requesting access. In such embodiments of the system, the access entitlement engine further includes one or more machine learning models configured to determine historical user behavior of the user in the computing network and the access entitlement engine is further configured to determine the access entitlement for the request by comparing the current user behavior to the historical use behavior.

In further specific embodiments of the system, the access entitlement engine is configured to determine the one or more present scenario parameters associated with the present scenario of the computing network-based application, wherein the one or more present scenario parameters associated with the present scenario of the computing network-based application includes at least one of (i) current volume of use of the computing network-based application, (ii) recent volume of occurrence of illicit events associated with using the computing network-based application, and/or (iii) recent occurrence of one or more specific types of illicit events associated with using the computing network-based application.

In additional specific embodiments of the system, the access entitlement engine is configured to determine the access entitlement for the request, wherein the access entitlement is deviating from standard access to the computing network-based application, wherein deviating from the standard access is customized for the user based at least on (i) the determined one or more present scenario parameters and (ii) historical use of the computing network-based application by the user.

Moreover, in additional specific embodiments of the system, the access entitlement engine is configured to determine a period for enforcing the access entitlement based at least on the one or more present scenario parameter. In specific embodiments of the system, the period is chosen from the group consisting of (i) a finite period of time, (ii) an indefinite period, (iii) a duration of a session resulting from the request. In other specific embodiments of the system, the access controller is further configured to generate and initiate communication of an access notification to the user that is configured to indicate the determined access entitlement.

A method for dynamic scenario-based access entitlement determination and control defines second embodiments of the invention. The method includes receiving a request from a user to access a computing network-based application and, in response to receiving the user request, determining one or more present scenario parameters associated with a present scenario of at least one of (i) the user, (ii) the computing network-based application, and (iii) one or more network devices currently executing the computer-network-based application. In response to determining the one or more present scenario parameters, the method further includes determining (i) an access entitlement for the request based at least on the one or more present scenario parameters. The access entitlement is chosen from the group consisting of (i) allow standard access to the computing network-based application, (ii) deviate from standard access to the computing network-based application, and (iii) deny access to the computing network-based application. In addition, the method includes responding to the request by controlling access to the computing network-based application in accordance with the determined access entitlement.

In specific embodiments of the method, determining the one or more present scenario parameters associated with the present scenario of the user, further defines the one or more present scenario parameters associated with the present scenario of the user as at least one chosen from the group consisting of (i) a geographic a location of the user, (ii) a current time at which the user is requesting access, and (iii) an occurrence of one or more predetermined triggering events by the user in the computing network prior to requesting access.

In further specific embodiments of the method, determining the one or more present scenario parameters associated with the present scenario of the user, further defines the one or more present scenario parameters associated with the present scenario of the user as current user behavior exhibited in the computing network prior to requesting access. In such embodiments the method may further include implementing one or more machine learning models to determine historical user behavior of the user in the computing network. Further, in such embodiments of the method, determining the access entitlement for the request further includes comparing the current user behavior to the historical use behavior.

In still further specific embodiments of the method, determining the one or more present scenario parameters associated with the present scenario of the computing network-based application, further defines the one or more present scenario parameters associated with the present scenario of the computing network-based application as at least one chosen from the group consisting of (i) current volume of use of the computing network-based application, (ii) recent volume of occurrence of illicit events associated with using the computing network-based application, and (iii) recent occurrence of one or more specific types of illicit events associated with using the computing network-based application.

A computer program product including a non-transitory computer-readable medium defines third embodiments of the invention. The computer program product includes sets of codes for causing one or more computing processing devices to receive a request from a user to access a computing network-based application and, in response to receiving the user request, determine one or more present scenario parameters associated with a present scenario of at least one of (i) the user, (ii) the computing network-based application, and (iii) one or more network devices currently executing the computer-network-based application. In addition, the sets of codes cause the computing processing device(s) to, in response to determining the one or more present scenario parameters, determine (i) an access entitlement for the request based at least on the one or more present scenario parameters. The access entitlement is chosen from the group consisting of (i) allow standard access to the computing network-based application, (ii) deviate from standard access to the computing network-based application, and (iii) deny access to the computing network-based application. Additionally, the sets of codes cause the computing processing device(s) to respond to the request by controlling access to the computing network-based application in accordance with the determined access entitlement.

In further specific embodiments of the computer program product, the set of codes for causing the one or more computing processing devices to determine the one or more present scenario parameters associated with the present scenario of the user, further cause the one or more computing processors devices to determine the one or more present scenario parameters associated with the present scenario of the user including at least one chosen from the group consisting of (i) a geographic a location of the user, (ii) a current time at which the user is requesting access, and (iii) an occurrence of one or more predetermined triggering events by the user in the computing network prior to requesting access.

In additional specific embodiments of the computer program product, the set of codes for causing the one or more computing processing devices to determine the one or more present scenario parameters associated with the present scenario of the user, further cause the one or more computing processors devices to determine the one or more present scenario parameters associated with the present scenario of the user include current user behavior exhibited in the computing network prior to requesting access. In such embodiments of the computer program product, the sets of codes further cause the one or more computing processing devices to implement one or more machine learning models to determine historical user behavior of the user in the computing network, and the set of codes for causing the one or more computing processing devices to determine the access entitlement for the request are further configured to cause the one or more computing processing devices to compare the current user behavior to the historical use behavior.

Moreover, in additional specific embodiments of the computer program product, the set of codes for causing the one or more computing processing devices to determine the one or more present scenario parameters associated with the present scenario of the computing network-based application, further cause the one or more computing processors devices to determine the one or more present scenario parameters associated with the present scenario of the computing network-based application including at least one chosen from the group consisting of (i) current volume of use of the computing network-based application, (ii) recent volume of occurrence of illicit events associated with using the computing network-based application, and (iii) recent occurrence of one or more specific types of illicit events associated with using the computing network-based application.

Thus, according to embodiments of the invention, which will be discussed in greater detail below, the present invention relies on current scenario indicators to determine, for a user requesting access to a network-based application, whether access/entitlement should be granted and, if so, the level of entitlement/access and the period for enforcing the determined access/entitlement. The current scenario indicators may be associated with the user, the application and/or the computing environment and are indicative of a heightened awareness for the occurrence of potential deceptive events or the likelihood for inefficiencies in use of the application. As a result, the present invention provides for addressing security and application stability concerns which may exist at the time the user requests access.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
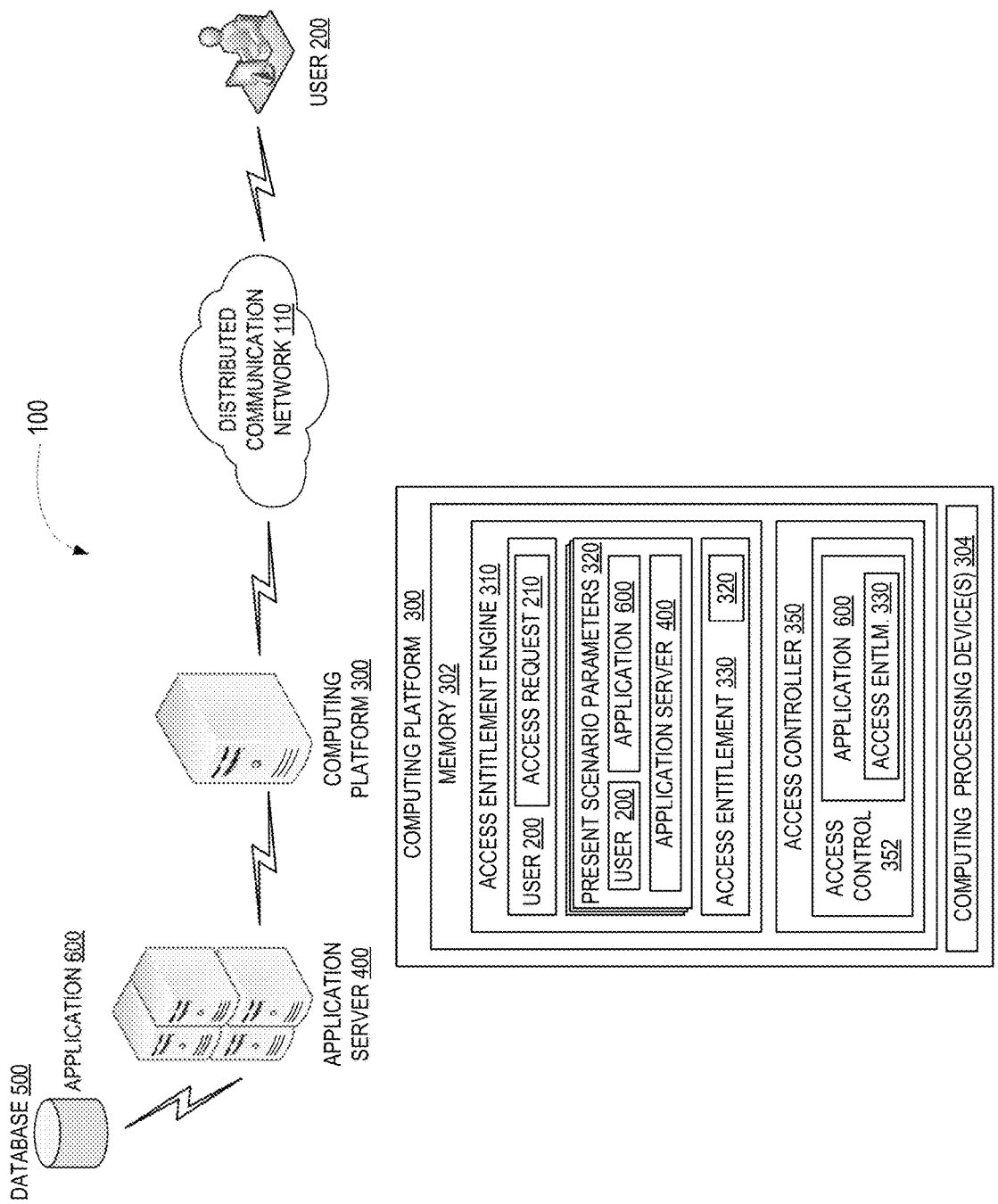
Figure 2:
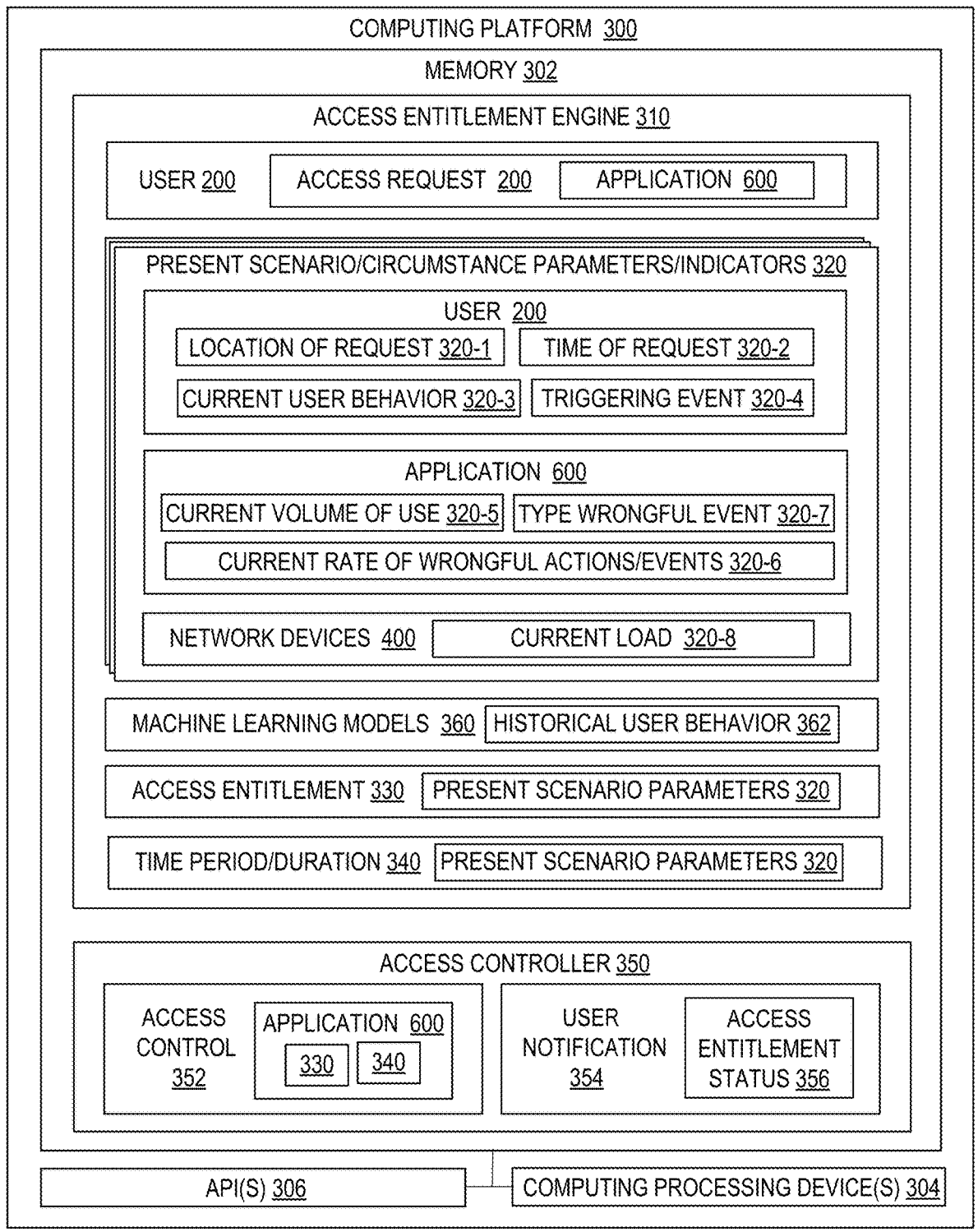
Figure 3:
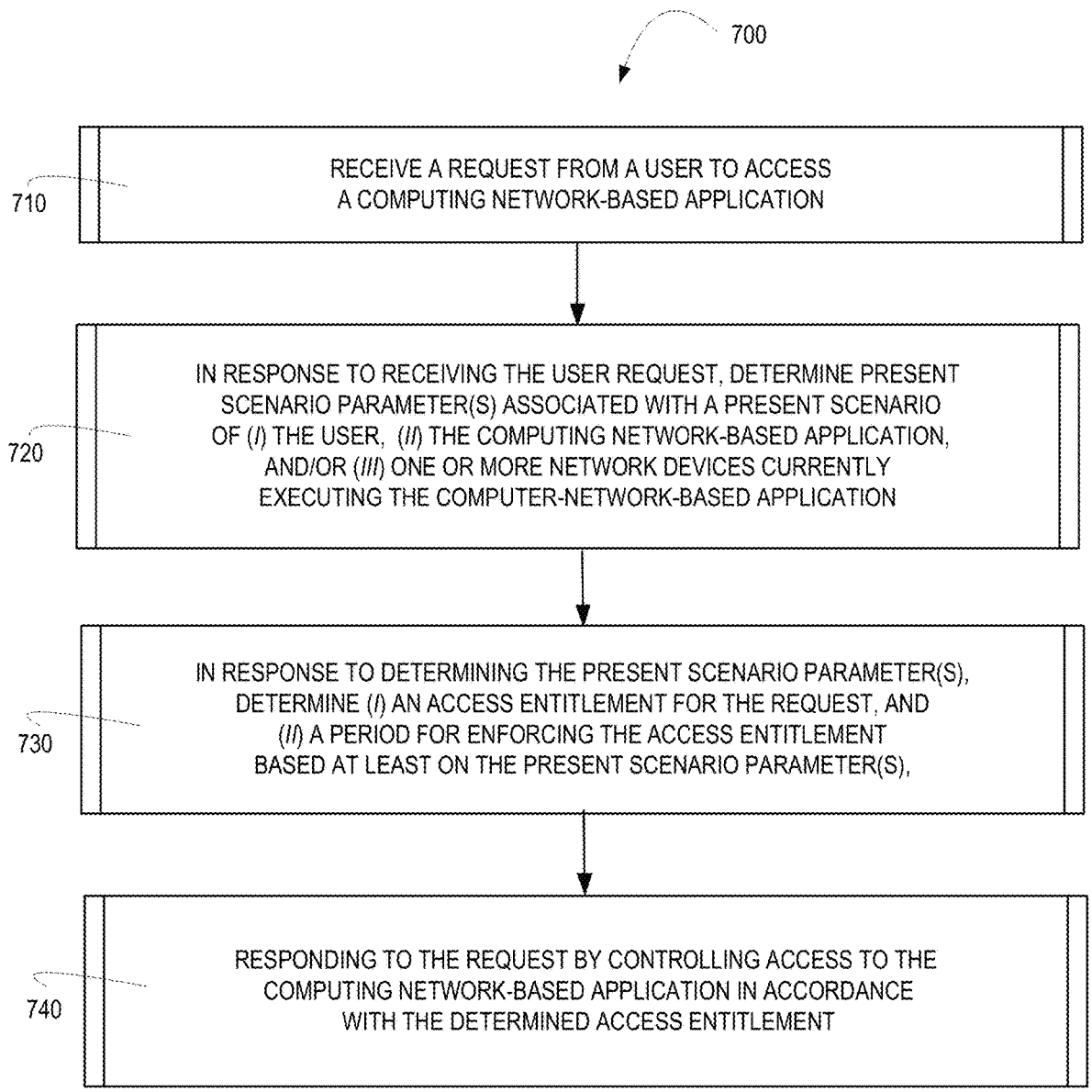

Having thus described embodiments of the disclosure in general terms, reference will now be made to the accompanying drawings, wherein:

FIG. 1 is a schematic/block diagram of system for dynamic scenario-based entitlement/access decisioning and control for network-based applications/utilities, in accordance with embodiments of the present invention;

FIG. 2 is a block diagram of a computing platform including an access entitlement engine and access controller, in accordance with embodiments of the present invention;

FIG. 3 is a flow diagram of a method for dynamic scenario-based entitlement/access decisioning and control, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing computer-executable program code embodied in computer-readable medium, and/or by having one or more application-specific circuits perform the function.

Thus, according to embodiments of the invention, which will be described in more detail below, systems, methods and computer program products are disclosed that provide for dynamic scenario-based entitlement/access decisioning and control. The dynamic nature of the entitlement/access decisioning means that determinations for granting/denying access and, in some instances, the level of access/entitlement are made based on the current scenario being experienced by the user, the application and/or the computing environment. In addition to determining access/entitlement decisions based on current scenarios/circumstances, the present invention is capable of determining the period for enforcing the access/entitlement decisions (e.g., finite time period, indefinite, current session only or the like) based on the current scenarios/circumstances.

For example, from a user scenario perspective, access/entitlement determination may be based on the current time at which the user is requesting access and/or the current geographic location of the user. In this regard, access/entitlement determinations consider whether the current time and/or location deviate from the normal time and/or location from which the user typically requests application access. Moreover, access/entitlement determination may be based on an analysis of the user's network behavior (i.e., actions performed or avoided) proximal in time to requesting application access. In such embodiments of the invention, access/entitlement determination may be based on a comparison between the user's current network behavior and the user's historical network behavior as determined by machine-learning models or the like. In specific embodiments, certain predetermined actions/triggering events taken by the user proximal in time to requesting application access may be determinative of an access/entitlement decision (e.g., denying or limiting access based an occurrence of the predetermined action/triggering event).

In other examples, from an application scenario perspective, access/entitlement determination may be based on the current load/use of the application and/or recent of rate wrongful events conducted within or otherwise associated with the application. In this regard, by denying or restricting/limiting a user's access entitlements during periods of peak usage, the present invention prevents against application failures/crashes or the like. Moreover, by denying or restricting/limiting a user's access entitlements when the application has recently experienced a high rate of wrongful events/actions, the present invention guards against the likelihood of further wrongful actions/events.

Thus, as will be evident by the detailed discussion associated with the referenced figures, the present invention serves the technical benefit of ensuring against application overload and serves the security benefit of guarding against possible nefarious actions on the behalf of wrongdoers.

Referring to FIG. 1, a schematic/block diagram is presented of a system 100 for scenario-based access entitlement to network-based applications, in accordance with embodiments of the invention. The system 100 is implemented within a distributed communication network 110, which may include the Internet, one or more intranets, one or more cellular networks or the like. The system 100 includes a computing platform 300, which may comprise an application server, and/or gateway device or the like. Computing platform 300 includes a memory 302 and one or more computing processing devices 304 in communication with memory 302.

Memory 302 stores access entitlement engine 310 that is executable by one or more of the computing processing device(s) 304. Access entitlement engine 310 is configured to receive an access request 210 from user 200 requesting access to application 600, which is stored in database 500 and executable via application server(s) 400. The term "application" as used herein includes any network-based application, system, utility or the like that is entitlement-based (i.e., requires the user to present user credentials or the like to gain access). The access request 210 may include the user credentials (e.g., username/passcode, user characteristic data or the like) or the user credentials may be provided by the user in a subsequent communication/input.

In response to receiving the access request 210, access entitlement engine 310 is further configured to perform dynamic analysis to determine, or otherwise receive, one more present/current scenario parameters/indicators 320, which indicate the present/current status/state of at least one of (i) the user 200, (ii) the application 600 and/or (iii) the network device on which the application 600 is executing (e.g., application server 400 or the like).

In response to determining/receiving the present scenario parameters 320, access entitlement engine 310 is further configured to determine an access entitlement 330 for the request 210 based at least on the determined present scenario parameters 320. The access entitlement that is determined may consist of one of (i) allow the user 200 standard access to the application 600, (ii) deviate from the standard access afforded to the user 200 and (iii) deny the user 200 access to the application 600. Standard access as used herein refers to the level of access currently assigned to the user. In this regard, standard access may be full access, allowing the user 200 full functionality and access within the application 600 or standard access may be less than full access, allowing the user 200 less than the full functionality or access within the application 600. Deviating from the standard access provides for either limiting the user's access/functionality or, in instances in which the standard access is less than full access, increasing the user's access/functionality.

Memory 302 of computing platform 300 further includes access controller 350 which is configured to respond to the request by providing access control 352 for the application 600 to the user 200 in accordance with the determined access entitlement 330. In additional embodiments of the system, access controller 350 is further configured to initiate generation of a user notification that provides the user 200 with notification of their determined access entitlement status.

Referring to FIG. 2 a block diagram is presented of computing platform 300, which may comprise one or multiple devices, such as application servers, and/or gateway devices or the like. Computing platform 300 includes memory 302, which may comprise volatile and/or non-volatile memory, such as read-only and/or random-access memory (RAM and ROM), EPROM, EEPROM, flash cards, or any memory common to computing platforms). Moreover, memory 302 may comprise cloud storage, such as provided by a cloud storage service and/or a cloud connection service.

Further, computing platform 300 includes one or more computing processing devices 304, which may be an application-specific integrated circuit ("ASIC"), or other chipset, logic circuit, or other data processing device. Computing processing device(s) 304 may execute one or more application programming interface (APIs) 306 that interface with any resident programs, such as access entitlement engine 310, access controller 350 or the like, stored in memory 302 of computing platform 300 and any external programs. Computing processing devices(s) 304 may include various processing subsystems (not shown in FIG. 2) embodied in hardware, firmware, software, and combinations thereof, that enable the functionality of computing platform 300 and the operability of computing platform 300 on a distributed communication network 110 (shown in FIG. 1), such as the Internet, intranet(s), cellular network(s), and the like. For example, processing subsystems allow for initiating and maintaining communications and exchanging data with other networked devices. For the disclosed aspects, processing subsystems of computing platform 300 may include any subsystem used in conjunction with access entitlement engine 310, access controller 350 and related tools, routines, sub-routines, algorithms, sub-algorithms, sub-modules thereof.

In specific embodiments of the present invention, computing platform 300 additionally includes a communications module (not shown in FIG. 2) embodied in hardware, firmware, software, and combinations thereof, that enables electronic communications between computing platform 300 and other networks and network devices, such as application server 400 and user devices. Thus, communication module may include the requisite hardware, firmware, software and/or combinations thereof for establishing and maintaining a network communication connection with one or more devices and/or networks.

As previously discussed, memory 302 of computing platform 300 stores access entitlement engine 310 that is executable by one or more of the computing processing device(s) 304. Access entitlement engine 310 is configured to receive an access request 210 from user 200 requesting access to application 600. The access request 210 may include the user credentials (e.g., username/passcode, user characteristic data or the like) or the user credentials may be provided by the user in a subsequent communication/input.

In response to receiving the access request 210, access entitlement engine 310 is further configured to perform dynamic analysis to determine, or otherwise receive, one or more present scenario/circumstance parameters/indicators 320, which indicate the present/current status/state of at least one of (i) the user 200, (ii) the application 600 and/or (iii) the network device on which the application 600 is executing (e.g., application server 400 or the like).

Present scenario/circumstances parameters/indicators 320 that indicate a current status/state of the user 200 include, but are not limited to, the geographic location 320-1 from which the request was sent (i.e., the current location of the user 200), the time 320-2 at which the request was received (e.g., time of day, week, month, year or the like), current user behavior 320-3 within the network during the current network session and/or proximate in time to the request, a predetermined triggering event 320-4 performed by the user 200 during the current network session and/or proximate in time to the request.

In those embodiments of the invention in which the present scenario parameters/indicators 320 include current user behavior 320-3 within the network, access entitlement engine 310 or some ancillary application/engine in communication with access entitlement engine 310, includes machine learning models 360 which are configured to learn, over time, the historical user behavior 362 within the network. In such embodiments of the invention, subsequent determination of the access entitlement 330 is performed by comparing the current user behavior 320-3 to the historical user behavior 362 to determine deviations from the historical user behavior 362 and render an appropriate access entitlement 330 based on the deviations from the historical user behavior 362.

Present scenario/circumstances parameters/indicators 320 that indicate a current status/state of the application 600 include, but are not limited to, the current volume of use 320-5 of the application 600, current rate of wrongful actions/events 320-6 (i.e., illicit misuse events) occurring within the application 600, and specific type(s) of wrongful actions/events 320-7 occurring in the application 600.

Present scenario/circumstances parameters/indicators 320 that indicate a current status/state of the network device (e.g., application server(s) 400) include, but are not limited to, the current load 320-8 on the network device, which may take into account other applications/services being executed on the network devices.

In response to determining/receiving the present scenario parameters 320, access entitlement engine 310 is further configured to determine an access entitlement 330 for the request 210 based at least on the determined present scenario parameters 320. As previously discussed, the access entitlement that is determined may consist of one of (i) allow the user 200 standard access to the application 600, (ii) deviate from the standard access afforded to the user 200 and (iii) deny the user 200 access to the application 600.

In further embodiments of the invention, access entitlement engine 310 is further configured to determine a time period/duration 340 for the access entitlement 330 based at least on the determined present scenario parameters 320. In such embodiments of the invention, the time period/duration 340 may be one of (i) the duration of the ensuing application session, (ii) a finite period of time, or (iii) indefinite period of time. In those embodiments of the invention in which the time period/duration 340 is the duration of the ensuing application session and the access entitlement deviates from the standard access, the access/entitlement will revert back to the standard access after the user 600 has ended the application session. In those embodiments of the invention in which the time period/duration 340 is a finite period of time (e.g., 15 minutes) which is less than the duration of the ensuing application session (e.g., 30 minutes) and the access entitlement deviates from the standard access, after the completion of the finite period of time, the access entitlement may revert back to the standard deviation or further determination of present scenario parameters may occur, in session, to determine if the assigned access entitlement should continue or if the access entitlement should revert to the standard access. In those embodiments of the invention, in which the time period/duration 340 is indefinite, the determined access entitlement becomes the standard access for the user and appropriate changes occur within the user's stored data file.

Memory 302 of computing platform 300 further includes access controller 350 which is configured to respond to the request by providing access control 352 for the application 600 to the user 200, in some embodiments for the determined time period 340, in accordance with the determined access entitlement 330. In additional embodiments of the system, access controller 350 is further configured to initiate generation and communication of a user notification 354 that provides the user 200 with notification of their determined access entitlement status 256 (i.e., informs the user that access has been denied or that access will deviate from the standard access (e.g., informs the user of restrictions/limitations that will occur in the ensuing application session).

Referring to FIG. 3, a flow diagram is shown of a method 700 for scenario-based access entitlement for network-based applications, in accordance with embodiments of the present invention. At Event 710, an access request is received from a user requesting access to application. The user may be an individual/human or a downstream application (i.e., non-human entity). The access request may include the user credentials (e.g., username/passcode, user characteristic data or the like) or the user credentials may be provided by the user in a subsequent communication/input.

In response to receiving the access request, at Event 720, dynamic analysis to determine, or otherwise receive, one more present scenario/circumstance parameters/indicators, which indicate the present/current status/state of at least one of (i) the user, (ii) the application and/or (iii) the network device(s) on which the application is currently executing (e.g., application server(s) or the like). As previously discussed, from the user perspective, the scenario parameters/indicates may indicate the current time, the current location from which the location was sent (i.e., user location), current user behaviors in the network and/or a predetermined triggering event performed by the user in the network or the like. From the application perspective, the scenario parameters/indicates may indicate the current volume of use, current rate of wrongful/deceptive actions/events, type of wrongful/deceptive actions/events recently occurring in the application and the like. Further, from the network device perspective, the scenario parameters/indicates may indicate the current load on the network devices.

In response to determining/receiving the present scenario parameters, at Event 730, an access entitlement is determined for the request based at least on the determined present scenario parameters. As previously discussed, the access entitlement that is determined may consist of one of (i) allow the user standard access to the application, (ii) deviate from the standard access currently assigned to the user, and (iii) deny the user access to the application. In further embodiments of the method (not shown in FIG. 3), a time period/duration for the access entitlement is determined based at least on the determined present scenario parameters. The time period duration may be the duration of the ensuing application session (i.e., single-use access entitlement), a finite time period (i.e., less than or more than the ensuing application session) or an indefinite time period (i.e., replacing the user's current standard access entitlement with the currently determined access entitlement).

In response to determining access entitlement and, in some embodiments, time period/duration, at Event 740, the request is responded to by controlling the user's access to the application in accordance with the dynamically determined access entitlement. In further embodiments of the method (not shown in FIG. 3), a user notification is generated and communicated to the user that informs the user of the access entitlement status and, if applicable, any restrictions/limitations or the like places on the ensuing application session.

Thus, present embodiments of the invention discussed in detail above, provide for dynamic application-level entitlement/access decisioning based on current scenario/circumstance indicators. In addition to determining whether a user requesting access should be granted access/entitlement the present invention is capable of determining the level of entitlement/access (i.e., partial access) and, in some instances, user-specific/customized access limitations. Moreover, the current scenario/circumstance indicators are relied on to determine the period for enforcing the resulting entitlement/access decision. As a result, the present invention provides for addressing security and application stability concerns which may exist at the time the user requests access.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for dynamic scenario-based access entitlement determination and control, the system comprising:
   a computing platform including a memory and one or more computing device processors in communication with the memory;
   an access entitlement engine stored in the memory, executable by at least one of the one more computing device processors and configured to:
      receive a request from a user to access a computing network-based application,
      in response to receiving the user request, determine one or more present scenario parameters associated with a present scenario of at least one of (i) the user, (ii) the computing network-based application, and (iii) one or more network devices currently executing the computing network-based application,
         wherein the one or more present scenario parameters associated with the present scenario of the computing network-based application includes current volume of use of the computing network-based application, recent volume of occurrence of illicit events associated with using the computing network-based application, and recent occurrence of one or more specific types of illicit events associated with using the computing network-based application, and
         wherein the one or more present scenario parameters associated with the present scenario of the one or more network devices currently executing the computing network-based application comprises a current load of each network device, wherein the current load of each network device is determined based one or more applications being executed thereon, and in response to determining the one or more present scenario parameters, determine, based on (i) the one or more present scenario parameters and (ii) historical use of the computing network-based application by the user, an access entitlement for the request, wherein the access entitlement is deviating from standard functionality access within the computing network-based application by providing one of (a) less than standard functionality access within the computing network-based application and (b) more than standard functionality access within the computing network-based application;

an access controller stored in the memory, executable by at least one of the one or more computing device processors, in communication with the access entitlement engine and configured to:

respond to the request by controlling the user's access to the computing network-based application in accordance with the determined access entitlement.

2. The system of claim 1, wherein the access entitlement engine is configured to determine the one or more present scenario parameters associated with the present scenario of the user, wherein the one or more present scenario parameters associated with the present scenario of the user includes a geographic location of the user.

3. The system of claim 1, wherein the access entitlement engine is configured to determine the one or more present scenario parameters associated with the present scenario of the user, wherein the one or more present scenario parameters associated with the present scenario of the user includes a current time at which the user is requesting access.

4. The system of claim 1, wherein the access entitlement engine is configured to determine the one or more present scenario parameters associated with the present scenario of the user, wherein the one or more present scenario parameters associated with the present scenario of the user includes current user behavior exhibited in the computing network prior to requesting access.

5. The system of claim 4, wherein the access entitlement engine further comprises one or more machine learning models configured to determine historical user behavior of the user in the computing network and wherein the access entitlement engine is further configured to determine the access entitlement for the request by comparing the current user behavior to the historical user behavior.

6. The system of claim 1, wherein the access entitlement engine is configured to determine the one or more present scenario parameters associated with the present scenario of the user, wherein the one or more present scenario parameters associated with the present scenario of the user includes an occurrence of one or more predetermined triggering events by the user in the computing network prior to requesting access.

7. The system of claim 1, wherein the access entitlement engine is further configured to determine a period for enforcing the access entitlement based at least on the one or more present scenario parameters.

8. The system of claim 7, wherein the access entitlement engine is configured to determine the period for enforcing the access entitlement based at least on the one or more present scenario parameters, wherein the period is chosen from the group consisting of (i) a finite period of time, (ii) a duration of a session resulting from the request, and (iii) an indefinite period.

9. A method for dynamic scenario-based access entitlement determination and control, the method comprising:

receiving a request from a user to access a computing network-based application;

in response to receiving the user request, determining one or more present scenario parameters associated with a present scenario of at least one of (i) the user, (ii) the computing network-based application, and (iii) one or more network devices currently executing the computing network-based application, wherein the one or more present scenario parameters associated with the present scenario of the computing network-based application includes current volume of use of the computing network-based application, recent volume of occurrence of illicit events associated with using the computing network-based application, and recent occurrence of one or more specific types of illicit events associated with using the computing network-based application, and wherein the one or more present scenario parameters associated with the present scenario of the one or more network devices currently executing the computing network-based application comprises a current load of each network device, wherein the current load of each network device is determined based one or more applications being executed thereon;

in response to determining the one or more present scenario parameters, determining, based on (i) the one or more present scenario parameters and (ii) historical use of the computing network-based application by the user, an access entitlement for the request, wherein the access entitlement is deviating from standard functionality access within the computing network-based application by providing one of (a) less than standard functionality access within the computing network-based application and (b) more than standard functionality access within the computing network-based application; and responding to the request by controlling the user's access to the computing network-based application in accordance with the determined access entitlement.

10. The method of claim 9, wherein the one or more present scenario parameters associated with the present scenario of the user includes at least one chosen from the group consisting of (i) a geographic location of the user, (ii) a current time at which the user is requesting access, and (iii) an occurrence of one or more predetermined triggering events by the user in the computing network prior to requesting access.

11. The method of claim 9, wherein the one or more present scenario parameters associated with the present scenario of the user includes current user behavior exhibited in the computing network prior to requesting access.

12. The method of claim 11, further comprising implementing one or more machine learning models to determine historical user behavior of the user in the computing network and wherein determining the access entitlement for the request further comprises comparing the current user behavior to the historical user behavior.

13. A computer program product comprising:

a non-transitory computer-readable medium comprising sets of codes for causing one or more computing processing devices to:

receive a request from a user to access a computing network-based application;

in response to receiving the user request, determine one or more present scenario parameters associated with a present scenario of at least one of (i) the user, (ii) the computing network-based application, and (iii) one or more network devices currently executing the computing network-based application, wherein the one or more present scenario parameters associated with the present scenario of the computing network-based application includes current volume of use of the computing network-based application, recent volume of occurrence of illicit events associated with using the computing network-based application, and recent occurrence of one or more specific types of illicit events associated with using the computing network-based application, and wherein the one or more present scenario parameters associated with the present scenario of the one or more network devices currently executing the computing network-based application comprises a current load of each network device, wherein the current load of each network device is determined based one or more applications being executed thereon;

in response to determining the one or more present scenario parameters, determine, based on (i) the one or more present scenario parameters and (ii) historical use of the computing network-based application by the user, an access entitlement for the request, wherein the access entitlement is deviating from standard functionality access within the computing network-based application by providing one of (a) less than standard functionality access within the computing network-based application and (b) more than standard functionality access within the computing network-based application; and respond to the request by the user's controlling access to the computing network-based application in accordance with the determined access entitlement.

14. The computer program product of claim 13, wherein the one or more present scenario parameters associated with the present scenario of the user includes at least one chosen from the group consisting of (i) a geographic a location of the user, (ii) a current time at which the user is requesting access, and (iii) an occurrence of one or more predetermined triggering events by the user in the computing network prior to requesting access.

15. The computer program product of claim 13, wherein the one or more present scenario parameters associated with the present scenario of the user includes current user behavior exhibited in the computing network prior to requesting access, wherein the sets of codes further cause the one or more computing processing devices to implement one or more machine learning models to determine historical user behavior of the user in the computing network, and the set of codes for causing the one or more computing processing devices to determine the access entitlement for the request are further configured to cause the one or more computing processing devices to compare the current user behavior to the historical user behavior.

* * * * *